J. L. COLE.
Steam-Plow.
No. 41,138.
2 Sheets—Sheet 1.
Patented Jan. 5, 1864.
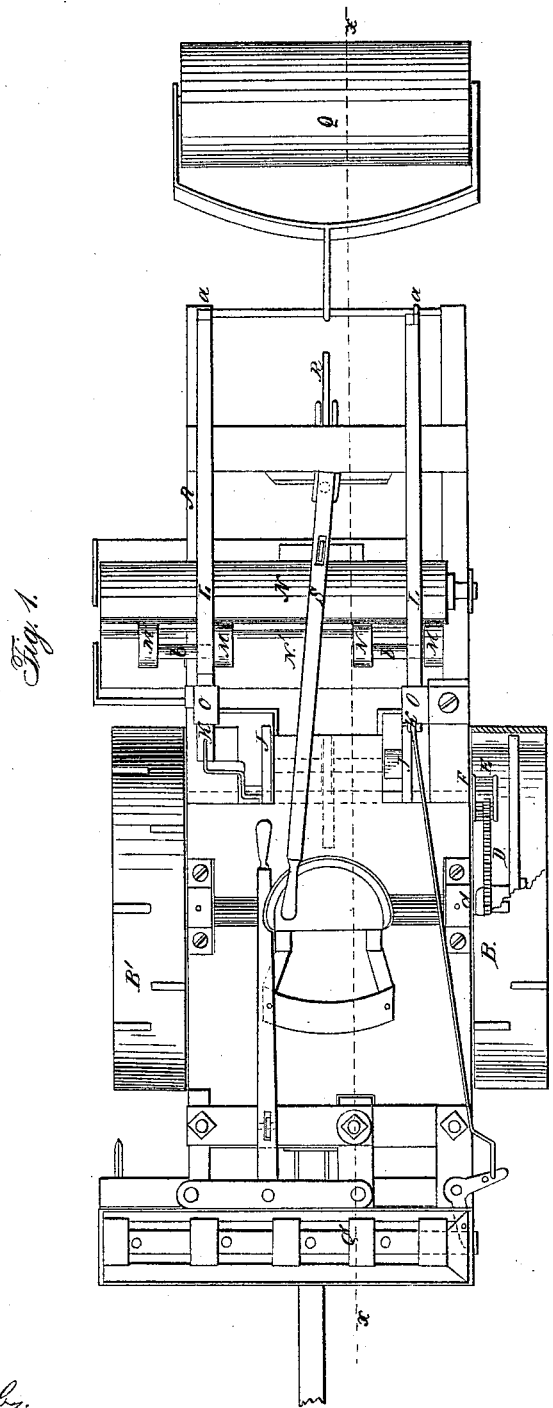

2 Sheets—Sheet 2.
J. L. COLE.
Steam-Plow.
No. 41,138.                     Patented Jan. 5, 1864.
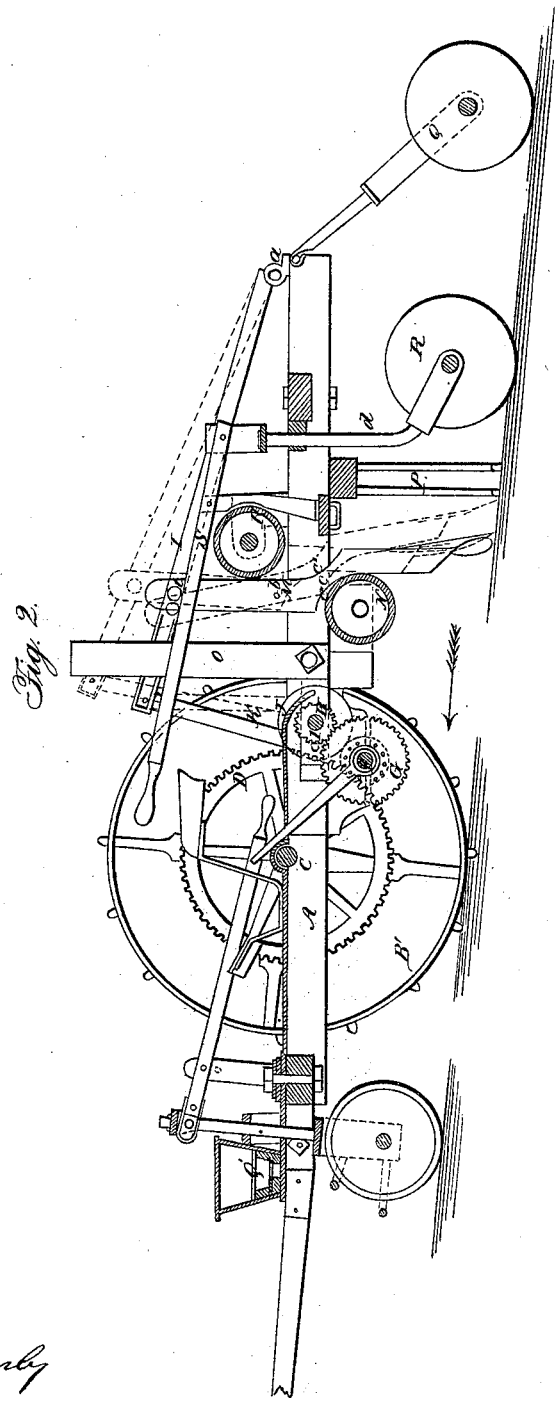
Witnesses:                          Inventor:

UNITED STATES PATENT OFFICE.

JAMES L. COLE, OF CHARITON, IOWA.

IMPROVEMENT IN SPADING-MACHINES.

Specification forming part of Letters Patent No. 41,138, dated January 5, 1864.

*To all whom it may concern:*

Be it known that I, JAMES L. COLE, of Chariton, in the county of Lucas and State of Iowa, have invented a new and Improved Spading-Machine; and I do hereby declare that the following is a full, clear, and exact description of the same, reference being had to the accompanying drawings, making a part of this specification, in which—

Figure 1, Sheet 1, is a plan or top view of my invention; Fig. 2, Sheet 2, a side sectional view of the same, taken in the line $x\ x$, Fig. 1.

Similar letters of reference indicate corresponding parts in the two figures.

This invention relates to a new and improved machine for spading the ground preparatory to the planting of seeds therein for germination.

The object of the invention is to supersede the plow by turning the soil in a more efficient manner and render the same more light and pliable, so as to be more permeable to air and moisture, and favor in a much greater degree the germination of the seed and the subsequent growth of the plants.

To this end the invention consists in the employment or use of spades or forks attached to standards of a peculiar shape, which are used in connection with rollers, and all arranged to operate in the manner substantially as hereinafter set forth.

To enable those skilled in the art to fully understand and construct my invention, I will proceed to describe it.

A represents a rectangular frame, the front part of which is supported by two wheels, B B', one of which, B, is attached permanently to its axle C, and the other, B', placed loosely on said axle, so as to facilitate the turning of the machine.

On the axle C there are placed two toothed wheels, D D. These wheels D adjoin and may be connected to the traction-wheels B B', and the former gear into pinions E E, which are on a shaft, F, the bearings of which are at the under side of the frame A. This shaft F has a toothed wheel, G, upon it at about its center, and said wheel G gears into a pinion, H, on a shaft, I, which is also placed in the frame A and parallel with the shaft F. The shaft I has a crank-pulley, J, at each end of it, and these crank-pulleys are connected by pitmen K with the front ends of levers L L, the back ends of the latter being connected by joints $a\ a$ with the back end of the frame A.

Each of the levers L has two spade or fork standards, M M, attached to it, the standards of each lever being connected at a suitable distance apart by cross-rods $b\ b$, the upper cross-rods passing through the levers and connecting the standards thereto. The standards M are not straight, but are formed with a crook or oblique portion, $c$, as shown clearly in Fig. 2, the upper and under surfaces of said crooks or oblique portions being concave, as shown at $c'\ c''$.

The standards M are fitted and work between rollers N N', one roller, N, being above the frame A, and the other, N', below it. These rollers are parallel with each other, and they are allowed to rotate freely.

From the above description it will be seen that as the frame A is drawn along the levers L will be moved up and down through the medium of the crank-pulleys J and pitman K. The machine moves in the direction indicated by the arrow in Fig. 2, and as the standards are forced downward under the action of the levers L the spades or forks enter the earth in a somewhat oblique position and throw the earth outward or backward, owing to the under surfaces, $c''$, of the oblique parts $c$ of the standards M bearing upon the lower roller, N', and as the standards are drawn upward they are forced inward or toward the front part of the machine, in consequence of the upper surfaces, $c'$, of the oblique parts $c$ of the standards coming in contact with the upper roller, N. These different positions of the standards are shown in red, black, and blue in Fig. 2. The levers L work in guides O, attached to the frame A, said guides preventing any lateral movement of the levers.

The spades may be of any proper shape or form. Forks may be used instead of spades, if desired, and to the frame A, directly behind the spades or forks, teeth P are attached to serve as a harrow. A roller, Q, may also be attached to the back part of the frame A to roll the spaded surface, and a seed-distributing device, Q′, may, when required, be placed on the front part of the frame A, the seed being deposited on the unspaded ground.

The back part of the frame A is supported by a caster-wheel, R, the arbor $d$ of which is attached to a lever, S, by actuating which the spades may be elevated above the surface of the ground when required. The depth of the penetration of the spades or forks into the earth may be regulated by attaching the pitmen K nearer to or farther from the center of the crank-pulleys J, different holes being made in the crank-pulleys for that purpose, and I propose to have the pitmen K so attached to their respective crank-pulleys that the spades or forks of the two levers L will not move simultaneously in the same direction, but one pair of spades or forks work in advance of the other.

I do not claim as new any parts pertaining to the roller, harrow, or seeding device, for those parts have all been previously used either separately or combined with other machines; but—

I do claim as new, and desire to secure by Letters Patent—

The spade or fork standards M, constructed with a crook or oblique portion, $c$, and operated through the medium of the levers L, pitmen K, and crank-pulleys J, or their equivalents, in combination with the rollers N N′, all arranged and applied to a mounted frame, A, to operate as and for the purpose herein set forth.

JAMES L. COLE.

Witnesses:
ROBERT McCORMICK,
ASBURY COLLIN.